United States Patent
Fong et al.

(10) Patent No.: US 9,345,024 B2
(45) Date of Patent: May 17, 2016

(54) EXCHANGING CONFIGURATION DATA

(71) Applicant: Intel Corporation, Santa Clara, CA (US)

(72) Inventors: Mo-Han Fong, Sunnyvale, CA (US); Geng Wu, Dallas, TX (US); Chang Hong Shan, Shanghai (CN); Puneet Jain, Hillsboro, OR (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 298 days.

(21) Appl. No.: 13/681,370

(22) Filed: Nov. 19, 2012

(65) Prior Publication Data

US 2013/0272181 A1    Oct. 17, 2013

Related U.S. Application Data

(60) Provisional application No. 61/624,185, filed on Apr. 13, 2012, provisional application No. 61/646,223, filed on May 11, 2012.

(51) Int. Cl.
*H04W 72/04* (2009.01)
*H04W 4/00* (2009.01)
*H04W 4/20* (2009.01)

(52) U.S. Cl.
CPC ............. *H04W 72/044* (2013.01); *H04W 4/00* (2013.01); *H04W 4/001* (2013.01); *H04W 4/20* (2013.01)

(58) Field of Classification Search
CPC ................ H04W 4/00; H04W 76/046–76/068
USPC ........................................................ 370/329
See application file for complete search history.

(56) References Cited

U.S. PATENT DOCUMENTS

2007/0259673 A1* 11/2007 Willars et al. ................. 455/453
2008/0276006 A1    11/2008 Choi
(Continued)

FOREIGN PATENT DOCUMENTS

| EP | 2364040 A1 | 9/2011 |
| EP | 2378799 A1 | 10/2011 |
| WO | 0117307 A1 | 3/2001 |

OTHER PUBLICATIONS

International Search Report and Written Opinion for International Application No. PCT/US2013/035948, mailed Jul. 26, 2013.
(Continued)

*Primary Examiner* — Huy D Vu
*Assistant Examiner* — Teisha D Hall
(74) *Attorney, Agent, or Firm* — Schwabe, Williamson & Wyatt, P.C.

(57) ABSTRACT

Embodiments of apparatus, computer-implemented methods, systems, devices, and computer-readable media are described herein for a user equipment ("UE") to generate, for transmission to a remote entity executing on a remote computing device in communication with the UE over an air interface of an Evolved Universal Terrestrial Radio Access Network ("EUTRAN"), a container that includes UE or base station (e.g., Evolved Node B, or "eNB") configuration data (e.g., an inactivity time interval), or over-the-top ("OTT") application configuration data. In embodiments, the UE may transmit the container through a logical tunnel passing through the air interface between a local processing entity executing on the computing device and the remote entity. A base station such as an eNB may be similarly configured to generate and/or transmit, to a UE, a container with UE, base station, or OTT application configuration data, through a logical tunnel passing through the air interface.

15 Claims, 5 Drawing Sheets

(56) References Cited

U.S. PATENT DOCUMENTS

| | | | | |
|---|---|---|---|---|
| 2009/0129342 | A1* | 5/2009 | Hwang et al. | 370/331 |
| 2010/0067400 | A1 | 3/2010 | Dolganow et al. | |
| 2010/0115072 | A1* | 5/2010 | Payyappilly et al. | 709/222 |
| 2011/0013559 | A1* | 1/2011 | Marin | 370/328 |
| 2011/0143743 | A1 | 6/2011 | Pollakowski et al. | |
| 2012/0008698 | A1* | 1/2012 | Ktenas et al. | 375/259 |

OTHER PUBLICATIONS

International Preliminary Report on Patentability mailed on Oct. 23, 2014 from International Application No. PCT/US2013/035948.

Naugle, "Network Protocols," McGraw-Hill Series on Computer Communications, Signature Edition, Aug. 1, 1998, pp. 500-501, IPv6 Tunneling, New York, USA.

3GPP, "Technical Specification Group Core Network and Terminals; User Data Convergence (UDC); Technical realization and information flows; Stage 2," 3GPP TS 23.335 V10.0.0, Lte Advanced, Release 10, Mar. 23, 2011, 39 pages.

3GPP, "Technical Specification Group Core Network and Terminals; Rx Interface and Rx/Gx signalling flows," 3GPP TS 29.211 V64.0 , GSM Global System for Mobile Commuications, Release 6, Jun. 22, 2007, 27 pages.

3GPP, "Technical Specification Group Core Network and Terminals; Policy and Charging Control over Rx reference point," 3GPP TS 29.214 V11.4.0, Lte Advanced, Release 11, Mar. 16, 2012, 51 pages.

3GPP, "Technical Specification Group Core Network and Terminals; IP Multimedia (IM) Subsystem Sh interface; Signalling flows and message contents," 3GPP TS 29.328 V11.3.0, Lte Advanced, Release 11, Mar. 22, 2012, 54 pages.

3GPP, "Technical Specification Group Core Network and Terminals; Sh Interface based on the Diameter protocol; Protocol details," 3GPP TS 29.329 V11.2.0, Lte Advanced, Release 11, Mar. 22, 2012, 22 pages.

Extended European Search Report issued Mar. 18, 2016 from European Patent Application No. 13775070.9, 11 pages.

Partial Supplementary European Search Report issued Dec. 1, 2015 from European Patent Application No. 13775070.9.

3GPP, "Technical Specification Group Core Network and Terminals; Non-Access-Stratum (NAS) protocol for Evolved Packet System (EPS); Stage 3 (Release 11)," 3GPP TS 24.301 V11.2.1, Mar. 16, 2012, Lte Advanced, 327 pages.

* cited by examiner

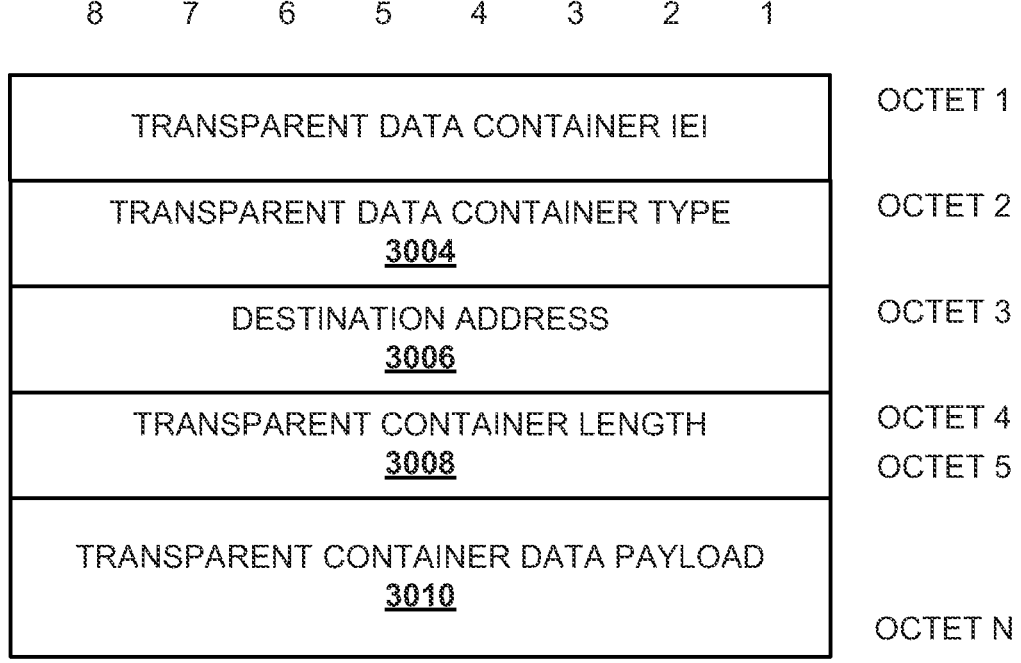
Fig. 3    3000

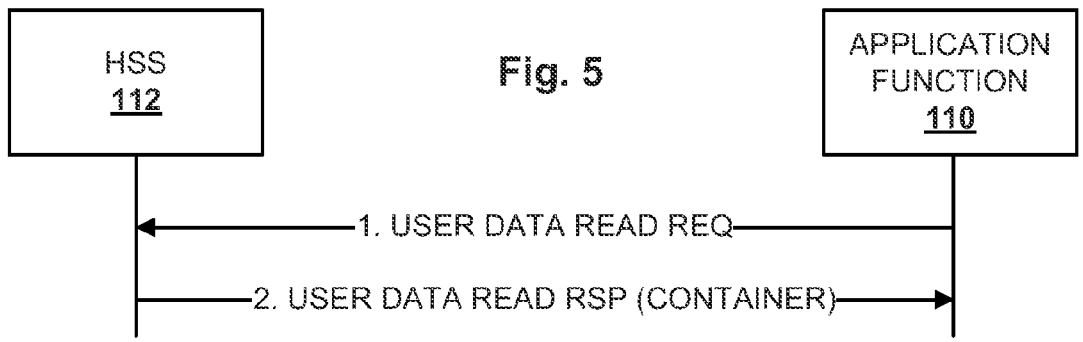
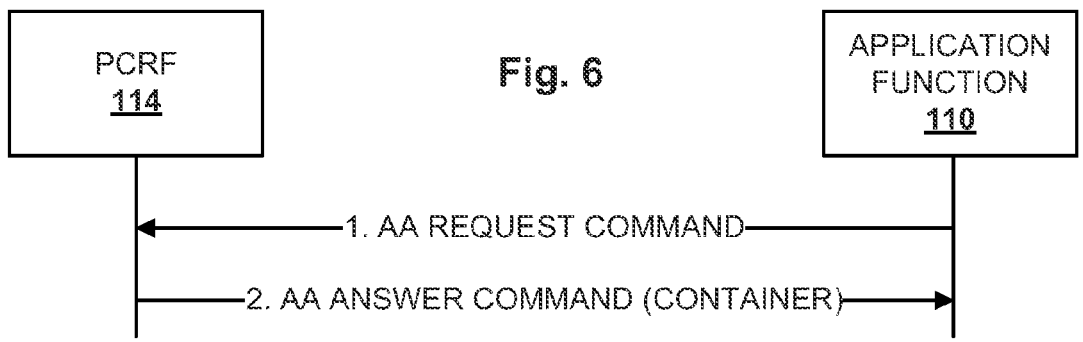
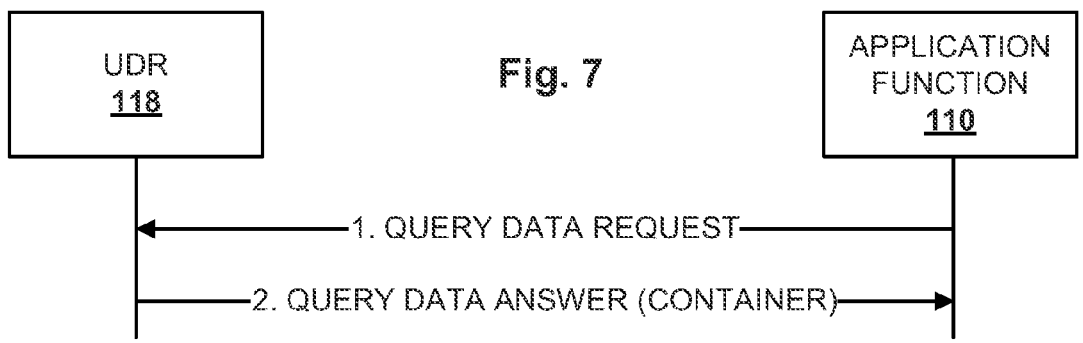

EXCHANGING CONFIGURATION DATA

CROSS REFERENCE TO RELATED APPLICATIONS

This application claims priority under 35 U.S.C. §119(e) to U.S. Provisional Patent Application Nos. 61/624,185 and 61/646,223, both entitled "ADVANCED WIRELESS COMMUNICATION SYSTEMS AND TECHNIQUES," filed Apr. 13, 2012 and May 11, 2012, respectively. Both disclosures are incorporated herein by reference.

FIELD

Embodiments of the present invention relate generally to the technical field of data processing, and more particularly, to exchanging user equipment, base station and/or over-the-top application configuration data.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

There may be limited ways to exchange user equipment ("UE"), base station (e.g., Evolved Node B, or "eNB"), and/or over-the-top ("OTT") application configuration data over an air interface of a wireless wide area network ("WWAN"). As a result, OTT applications (e.g., video chat, streaming video, web browsers, etc.) may use the same best effort (e.g., non-guaranteed bit rate) radio bearer, regardless of whether the OTT application is real time or non-real time, without Quality of Service ("QoS") differentiation.

Additionally, a base station such as an eNB may transition UEs it serves from an active mode (e.g., "connected") to an inactive mode (e.g., "idle"), e.g., if a UE is inactive for longer than a predetermined inactivity time interval. For instance, if the eNB is configured with an inactivity time interval of five seconds, the eNB may trigger a UE to transition to idle if the UE is inactive for more than five seconds. However, an "application function" (e.g., any logic hosted anywhere on a WWAN or a public data network, or "PDN") may periodically transmit recurring notifications such as "keep-alive" messages to corresponding logic operating on the UE. If a time interval between transmission of keep-alive messages is less than the serving eNB's inactivity time interval, then the UE may remain in active mode. However, if the time interval between keep-alive messages is greater than the eNB's inactivity time interval, then the UE may repeatedly transition to idle mode, only to be "re-awakened" by recurring keep-alive messages. These transitions may consume computing and network resources.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 3 schematically depicts an example container for exchange of UE or base station configuration data, or for exchange of over-the-top ("OTT") application configuration data, in accordance with various embodiments.

FIGS. 4-7 schematically depict examples of how an application function may retrieve or otherwise obtain an inactivity time interval associated with a UE, in accordance with various embodiments.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
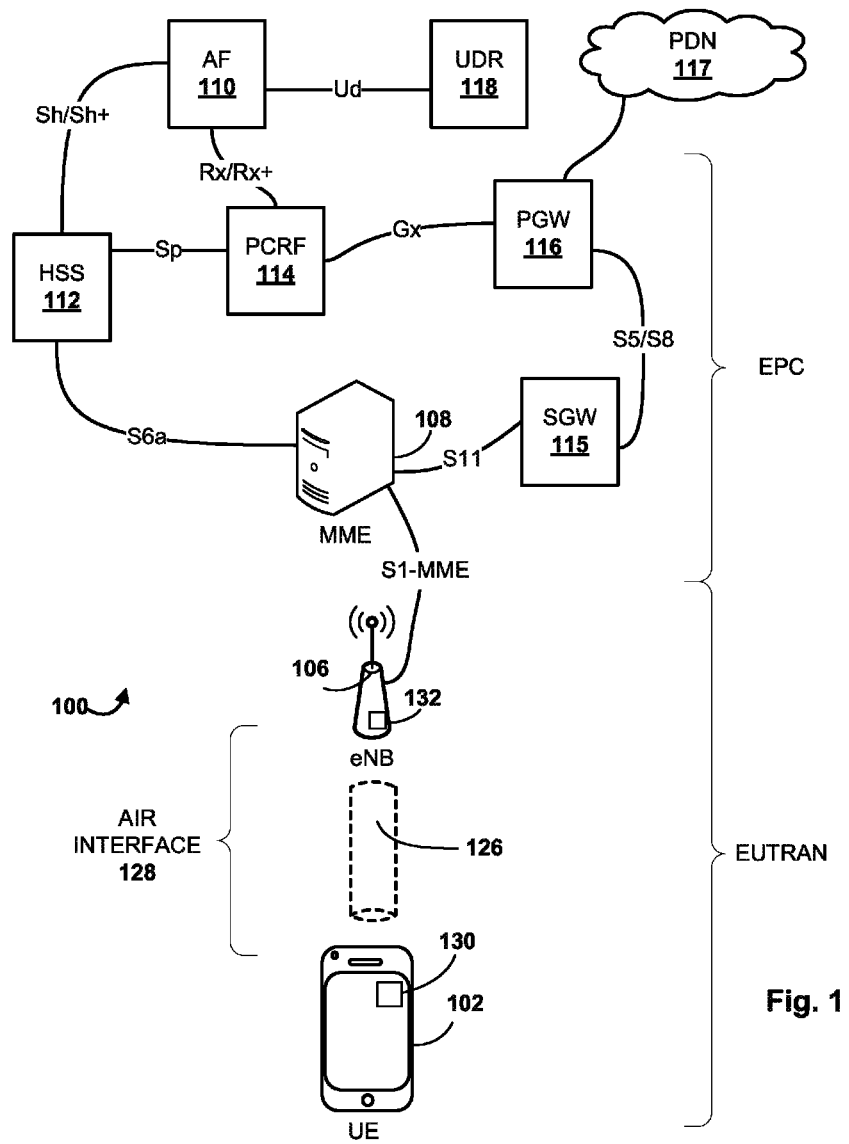
FIG. 1 schematically illustrates various network entities configured with applicable portions of the present disclosure to facilitate exchange of configuration data, in accordance with various embodiments.

An example wireless wide area network ("WWAN") 100 is depicted in FIG. 1. A user equipment ("UE") 102 in the form of smart phone (configured with applicable portions of the teachings of the present disclosure) may be in wireless communication with WWAN 100. For example, UE 102 may be in direct wireless communication with a base station in the form part of an evolved Node B ("eNB") 106. eNB 106 and the UEs it serves may together form an Evolved Universal Terrestrial Radio Access Network, or "EUTRAN."

Although UE 102 is depicted as a touch screen smart phone, this is not meant to be limiting. As discussed below, computing devices described herein may be any type of data processing device, including but not limited to a tablet computer, a personal digital assistant ("PDA"), a portable gaming device, and so forth. Moreover, while in examples described herein, Long Term Evolution ("LTE") components such as eNBs are described, other types of base stations may be configured with application portions of the present disclosure.

eNB 106 may be in network communication with various components of an Evolved Packet Core ("EPC"). For example, eNB 106 may be in network communication with a mobility management entity ("MME") 108, e.g., via an S1-MME interface. MME 108 may be configured to perform various functions, including but not limited to non-access stratum ("NAS") signaling and NAS signaling security, idle mode UE reachability, public data network ("PDN") and serving gateway ("SGW") selection, MME selection for handoffs, authentication, bearer management functions, and so forth.

An application function ("AF") 110 may be operating, e.g., beyond the EPC. The term "application function" or "AF" as used herein may include any type of logic implemented with any combination of hardware and/or software, particularly logic that is configured to respond to requests received over the network, such as a server portion of a client-server application. For example, an AF may be any element offering application(s) that use IP bearer resources.

AF 110 may be in network communication with various entities in the EPC. For instance, AF 110 may be in communication with a home subscriber server ("HSS") 112. HSS 112 may be configured to perform various functions, including but not limited to storage of subscriber data, maintaining a roaming restricts list, maintenance of current UE tracking areas, provision of subscriber policies, and so forth. In various embodiments, AF 110 may be configured to exchange data with HSS 112 over an Sh or Sh+ interface, e.g., as described in the $3^{rd}$ Generation Partnership Project ("3GPP") Technical Specification ("TS") 29.328 V11.5.0 (2012-09).

AF 110 may also be in network communication with a Policy Charge and Rules Function ("PCRF") 114. PCRF 114 may be configured to perform various functions, including but not limited to interfacing with various policy-enabled application functions (e.g., AF 110), interfacing with a PDN gateway ("PGW") 116 in accordance with a user subscriber policy, and so forth. In various embodiments, AF 110 may be configured to exchange data with PCRF 114 using an Rx or Rx+ interface, e.g., as described in 3GPP TS 29.211 V6.4.0 (2007-06) or 3GPP TS 29.214 V11.6.0 (2012-09).

MME 108 may be in network communication with a SGW 115, e.g., via an S11 interface. SGW 115 may in turn be in communication with PGW 116, e.g., via an S5/S8 interface. PGW 116 may connect to a PDN 117, and may perform various functions, including but not limited to per-user packet filtering, lawful interception of data, UE IP address allocation, transport-level packet marking for downlinking, uplink/downlink service level charging, gating, and rate enforcement, and so forth.

AF 110 may also be in network communication with a user data repository ("UDR") 118. UDR 118 may perform various functions, including but not limited to user data creation, inquiry, updating, deletion, subscribing and notification. In various embodiments, AF 110 may be configured to exchange data with UDR 118 over a User Data Convergence ("Ud") interface, e.g., as described in 3GPP TS 23.335 V11.0.0 (2012-09).

In various embodiments, various computing devices, such as UE 102 or eNB 106, may be configured to exchange UE or base station (e.g., eNB 106) configuration data, or over-the-top ("OTT") application configuration data, with remote computing devices. In various embodiments, this information may be passed between these devices through a logical tunnel 126 over an air interface 128 of the EUTRAN.

For example, a first tunnel endpoint (e.g., the source or sink of logical tunnel 126) in the form of a first processing entity 130 may operate on UE 102. A second tunnel endpoint (e.g., the source or sink of logical tunnel 126) in the form of a second processing entity 132 may operate on another network node. In examples described herein, second processing entity 132 operates on eNB 106, but this is not meant to be limiting, and second processing entity 132 may operate on other network nodes, particularly those near the edge of the EPC.

Logical tunnel 126 may be implemented in various ways. In some embodiments, logical tunnel 126 may reside on a data plane of air interface 128. A PDN connection separate from other PDN connections associated with UE 102 may be established for logical tunnel 126. In various embodiments, a PGW (e.g., PGW 116) associated with this separate connection may reside on the same computing device as eNB 106 or may reside on a separate physical computing device. PGW 116 may forward and/or receive data to/from second processing entity 132. In various embodiments, the separate PDN connection may be set up during an attach procedure, a service request procedure, or when UE 102 is in a connected mode.

In other embodiments, logical tunnel 126 may reside on a control plane of air interface 128. In various embodiments, entities implementing layer 3 signal processing may treat traffic through logical tunnel 126 as user data without interpretation or processing. However, in some often-used applications or functions, communications through logical tunnel 126 may be combined with or be a subset of layer 2 and/or layer 3 air interface signaling. In some embodiments, data may be transmitted through logical tunnel 126 using at least one of radio resource control ("RRC") signaling or NAS signaling. In some embodiments, logical tunnel 126 may include layer 2 tunnels for shorter latency and/or tighter coupling.

In various embodiments, logical tunnel 126 may be carried over a common and/or dedicated channel. In various embodiments, this channel may be a physical or transport channel. In various embodiments, signaling messages sent through logical tunnel 126 may be in a proprietary format, an application-specific format, or formatted in accordance with open standards. In various embodiments, signaling messages sent through logical tunnel 126 may be Internet Protocol ("IP") based or non-IP based.

Logical tunnel 126 may be implemented using various types of transmission. In various embodiments, logical tunnel 126 may be implemented by and between a single transmitting node (e.g., UE 102) and a single receiving node (e.g., eNB 106). In various embodiments, cooperative Multi-point ("CoMP") transmission may be implemented. In various embodiments, multiple Carrier Aggregation ("CA") may be implemented.

Logical tunnel 126 may be established at various times and/or in response to various events. For instance, in various embodiments, logical tunnel 126 may be established during connection/session set up, e.g., for information exchange between UE 102 and eNB 106 on signal processing configuration, establishment of multiple in multiple out ("MIMO") codebook, establishment of a security context, establishment of a traffic template, and so forth. Additionally or alternatively, logical tunnel 126 may operate during an active session, e.g., for continuous out-of-band application signaling, such as cross-layer adaptation.

Figure 2:
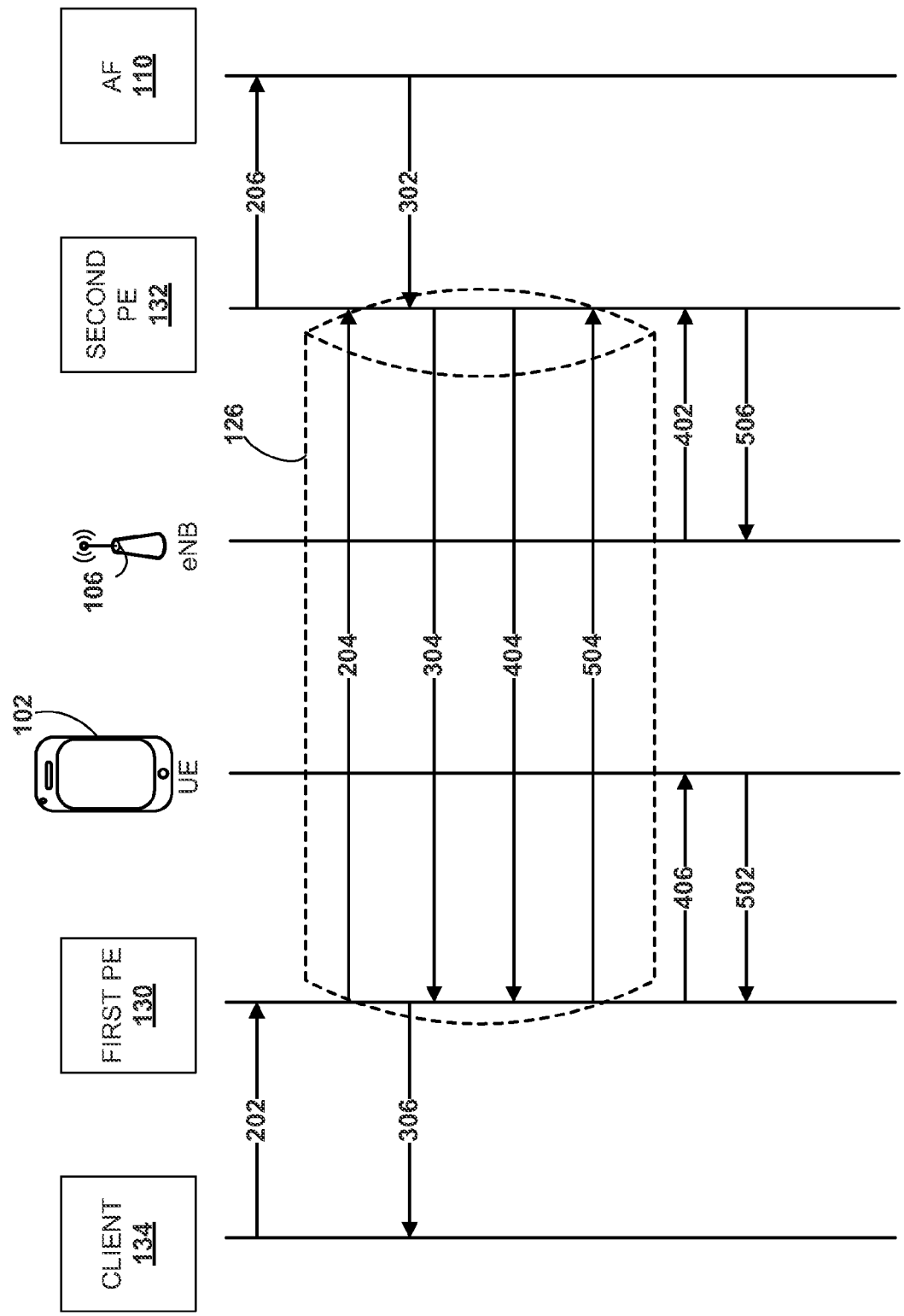
FIG. 2 schematically depicts example communications that may be exchanged between various entities through a logical data tunnel over an air interface, in accordance with various embodiments.

FIG. 2 depicts various communication patterns that may occur between first processing entity ("PE" in FIG. 2) 130, second processing entity 132, and various other entities. In this example, first processing entity 130 may operate on UE 102, and second processing entity 132 may operate on eNB 106, though other configurations are possible.

A client application 134 may operate on UE 102, and may comprise any logic configured to communicate with corresponding logic on a remote computing device. For example, client application 134 may be an OTT application such as a video chat application or a web browser. At arrow 202, a communication may be sent from client application 134 to first processing entity 130. In some embodiments, client 134 may deliberately address the communication to first processing entity 130, e.g., if client 134 is "aware" of first processing entity 130 and/or desires to send data through logical tunnel 126. In other embodiments, first processing entity 130 may intercept and inspect packets from client 134, and determine whether those packets should be transmitted through logical tunnel 126 or using conventional means.

Either way, at arrow 204, first processing entity 130 may encapsulate the data received from client application 134 in a container that will be transparent to other layers of UE 102 and/or eNB 106, and transmit the container through logical tunnel 126 to second processing entity 132, e.g., using RRC signaling. Second processing entity 132 may inspect the container (an example container will be described below with reference to FIG. 3) to determine what to do with its payload. For example, client application 134 may be in communication with an AF 110 executing on a computing device remote from UE 102. If the container's payload includes configuration data related or relevant to AF 110, such as Quality of Experience ("QoE") feedback (e.g., video playback buffer on UE 102 experiencing starvation), then second processing entity 132 may forward the configuration data to AF 110 at arrow 206.

AF 110 may transmit data to client application 134 in a similar manner, except in reverse. For example, at arrow 302, AF 110 may transmit data to second processing entity 132, deliberately or by way of interception by second processing entity 132. Second processing entity 132 may package the data in a container and transmit it to first processing entity 130 through logical tunnel 126 at arrow 304. At arrow 306, first processing entity 130 may extract a payload of UE, base station or OTT application configuration data from the container and forward it to client application 134.

Entities other than client application 134 and AF 110 may exchange data through logical tunnel 126. At arrow 402, eNB 106 itself may transmit UE/base station/OTT application configuration data, or a request for such configuration data, to second processing entity 132 (or second processing entity 132 may intercept it). For instance, eNB 106 may provide a request for an inactivity time interval associated with UE 102, an indication of one or more services offered by eNB 106 (e.g., UE proximity connectivity support), configuration data for heterogeneous network management or multiple radio access technology ("RAT") resource management, an indication of a platform or hardware capability of eNB 106, and so forth.

Second processing entity 132 may encapsulate the configuration data/request into a container, and at arrow 404 may transmit the container through logical tunnel 126 to first processing entity 130, e.g., using RRC signaling. At arrow 406, first processing entity 130 may inspect the container for a destination address, and may forward the configuration data to appropriate logic on UE 102.

UE 102 may similarly transmit UE/base station/OTT application configuration data, or a request for such configuration data, to other entities via logical tunnel 126. At arrow 502, UE 102 may transmit configuration data to first processing entity 130 (or first processing entity 130 may intercept configuration data transmitted by UE 102). In this scenario, configuration data may include but is not limited to a Quality of Service ("QoS") template for deep packet inspection, an indication of a platform or hardware capability of UE 102, an application executed by UE 102, an inactivity time interval associated with UE 102, cross-layer adaptation configuration data, and so forth.

First processing entity 130 may encapsulate the configuration data into a container, and at arrow 504 may transmit the container to second processing entity 132 through logical tunnel 126. At arrow 506, second processing entity 132 may extract the configuration data from the container and forward it to eNB 106. eNB 106 may take various actions in response to receipt of this data. For instance, if the configuration data included an indication that UE 102 has a particular architecture that is compatible with an architecture of eNB 106, eNB 106 may alter a manner in which it communicates with UE 102 to take advantage of the compatibility.

FIG. 3 depicts an example transparent container 3000, which may be identified by a transparent data container information element identifier ("IEI"), that may be exchanged between various entities through logical tunnel 126. In various embodiments, container 3000 may be encapsulated in RRC and/or NAS for transmission through logical tunnel 126. A type field 3004 may indicate the type of information encapsulated in container 3000, e.g., so that first processing entity 130 or second processing entity 132 knows how to process a payload 3010 of container 3000. A destination address field 3006 may provide information to UE 102 or eNB 106 to forward the encapsulated configuration data to the corresponding local processing entity (e.g., 130 or 132) in the eNB or UE, or to the remote processing entity (130 or 132). A length field 3008 may indicate a length of payload 3010.

Payload 3010 may include UE, base station or OTT application configuration data. Some examples of configuration data that may be encapsulated in container 3000 are described above. Other types of UE, base station, or OTT application configuration data that may be encapsulated in container 3000, e.g., for transmission through logical tunnel 126, may pertain to various technologies, including but not limited to cross-layer adaptation (e.g., adaptive source coding), enhanced security, dynamic client-cloud signal processing workload distribution, cloud-assisted UE performance improvement (e.g., eNB caching, eNB media re-formatting), eNB-assisted UE proximity connectivity support, low-power short data burst transport for Machine Type Communications ("MTC"), and so forth.

In another aspect, UE 102 often may be battery-powered, and hence may be configured to conserve power. For example, UE 102 may be transitioned between an active mode (e.g., "connected") to an inactive mode (e.g., "idle"). In the active mode, UE 102 may consume more power than in the inactive mode. In various embodiments, UE 102 may have an associated threshold "inactivity time interval," e.g., provided or enforced by the serving eNB 106, that specifies a threshold time interval. If UE 102 is inactive longer than the threshold, it may transition, or be transitioned by eNB 106, from the active mode to the inactive mode, e.g., as part of a discontinuous reception ("DRX") cycle.

Logic operating on UE 102, such as client application 134, may be in periodic communication with corresponding logic, such as AF 110 or a server portion of a client-server application. For instance, even if there is no active interaction between client application 134 and AF 110, AF 110 may nonetheless send recurring "keep-alive" messages to client application 134. In some cases, AF 110 may send these keep-alive messages periodically, e.g., at a particular time interval.

Assume the time interval between transmission of keep-alive messages is greater than the inactivity time interval associated with UE 102. For example, assume the inactivity time interval is five seconds, and the time interval between keep-alive messages being transmitted from AF 110 to client application 134 is six seconds. After five seconds of inactivity, UE 102 may transition, e.g., in response to a command from eNB 106, from connected to idle. However, it may transition back from idle to connected almost immediately upon receipt, by client application 134, of a keep-alive message from AF 110. Transition between connected mode and idle mode may require computing resources (e.g., state transitions by UE 102) and may generate network traffic, e.g., frequent paging.

Accordingly, in various embodiments, AF 110 may be configured to obtain, from another computing device over a computer network, an inactivity time interval associated with UE 102. In various embodiments, AF 110 may schedule transmission of one or more keep-alive notifications to client application 134 to reduce a frequency of state transitions by UE 102 based on the inactivity time interval associated with UE 102.

AF 110 may obtain the inactivity time interval from various sources. For example, the inactivity time interval may be obtained by AF 110 from eNB 106.

In FIG. 4, AF 110 may obtain the inactivity time interval from client application 134. For instance, client application 134 may transmit a container containing an inactivity time interval of UE 102 to AF 110 during application registration, re-registration and/or dynamic parameter update procedures. In various embodiments, the container may be independent of the access and core network and may be passed through logical tunnel 126.

As shown in FIG. 5, the inactivity time interval alternatively may be obtained, e.g., by AF 110, from HSS 112 via an Sh or Sh+ interface. For instance, AF 110 obtain or retrieve the container during application authentication, e.g., by transmitting to HSS 112 a user data read request. In response, HSS 112 may transmit a user data read response and container. AF 110 may also obtain the container during a profile update, a subscribes notifications request, a push notifications request, and so forth.

As shown in FIG. 6, the inactivity time interval may alternatively be obtained, e.g., by AF 110, from PCRF 114 via an Rx or Rx+ interface. For example, AF 110 may transmit, to PCRF 114, an Application Authorization ("AA") command. PCRF 114 may respond with an AA answer command and/or a container with the inactivity time interval.

As shown in FIG. 7, the inactivity time interval may alternatively be obtained, e.g., by AF 110, from UDR 118 via a Ud interface. For instance, AF 110 may transmit, to UDR 118, a query data request. UDR 118 may respond with a query data answer and/or a container with the inactivity time interval.

In various embodiments, the container containing the inactivity time interval may contain other cross-layer information, including but not limited to a sending start time, that application function may use to schedule transmission of keep-alive messages.

In various embodiments, AF 110 may schedule a transmission start time of the one or more keep-alive notifications to UE 102 based on the inactivity time interval. In various embodiments, the one or more keep-alive notifications may include a plurality of periodically recurring messages. In various embodiments, AF 110 may schedule a transmission time interval of the plurality of periodically recurring messages based on the inactivity time interval.

Figure 8:
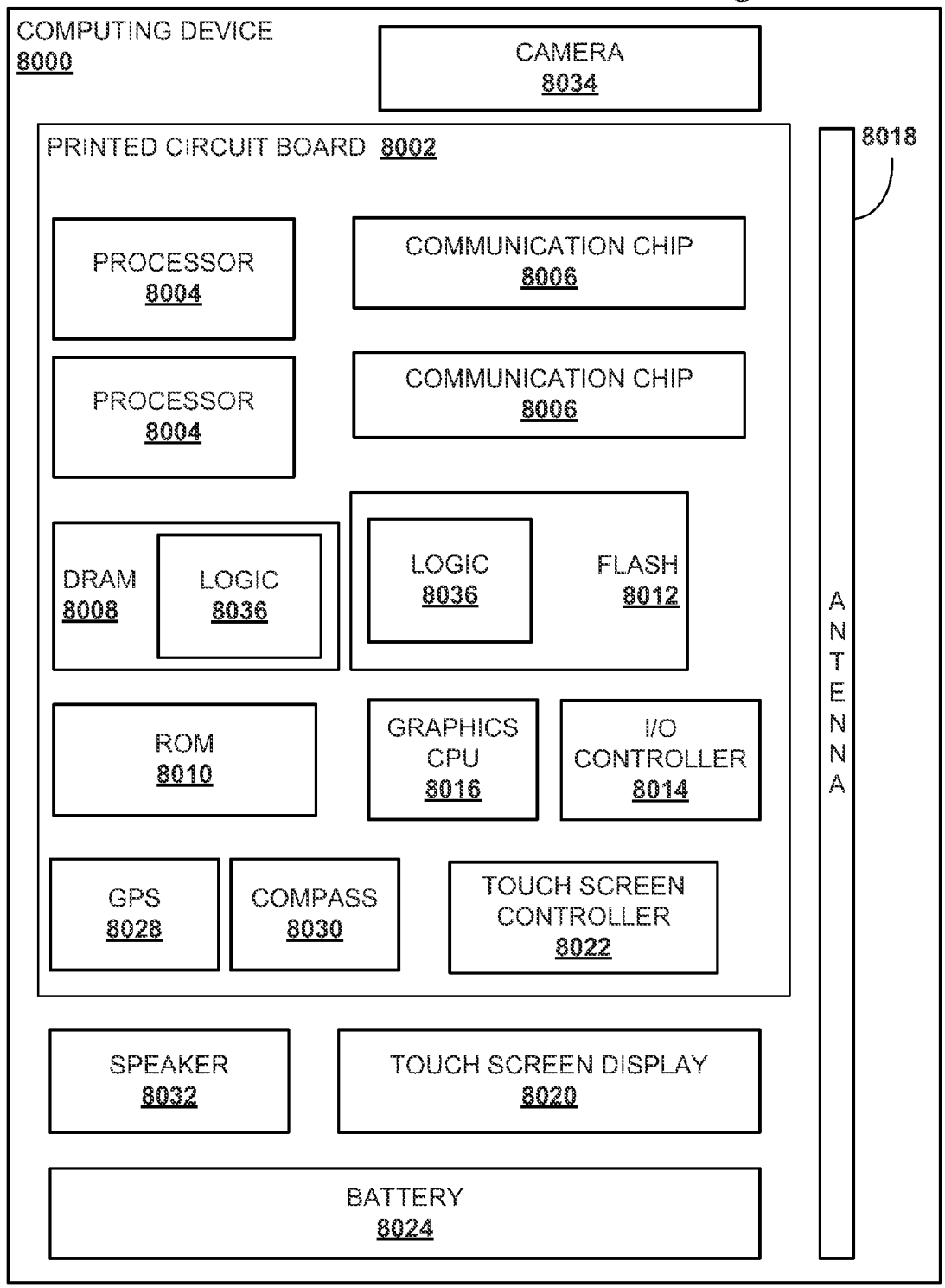
FIG. 8 schematically depicts an example computing device on which disclosed methods and computer-readable media may be implemented, in accordance with various embodiments.

FIG. 8 illustrates an example computing device 8000, in accordance with various embodiments. UE 102, eNB 106 or any other network entity described herein may be implemented on a computing device such as computing device 8000. Computing device 8000 may include a number of components, one or more processor(s) 8004 and at least one communication chip 8006. In various embodiments, the one or more processor(s) 8004 each may be a processor core. In various embodiments, the at least one communication chip 8006 may also be physically and electrically coupled to the one or more processor(s) 8004. In further implementations, the communication chip 8006 may be part of the one or more processor(s) 8004. In various embodiments, computing device 8000 may include printed circuit board ("PCB") 8002. For these embodiments, the one or more processor(s) 8004 and communication chip 8006 may be disposed thereon. In alternate embodiments, the various components may be coupled without the employment of PCB 8002.

Depending on its applications, computing device 8000 may include other components that may or may not be physically and electrically coupled to the PCB 8002. These other components include, but are not limited to, volatile memory (e.g., dynamic random access memory 8008, also referred to as "DRAM"), non-volatile memory (e.g., read only memory 8010, also referred to as "ROM"), flash memory 8012, an input/output controller 8014, a digital signal processor (not shown), a crypto processor (not shown), a graphics processor 8016, one or more antenna 8018, a display (not shown), a touch screen display 8020, a touch screen controller 8022, a battery 8024, an audio codec (not shown), a video codec (not shown), a global positioning system ("GPS") device 8028, a compass 8030, an accelerometer (not shown), a gyroscope (not shown), a speaker 8032, a camera 8034, and a mass storage device (such as hard disk drive, a solid state drive, compact disk ("CD"), digital versatile disk ("DVD"))(not shown), and so forth. In various embodiments, the processor 8004 may be integrated on the same die with other components to form a System on Chip ("SoC").

In various embodiments, volatile memory (e.g., DRAM 8008), non-volatile memory (e.g., ROM 8010), flash memory 8012, and the mass storage device may include programming instructions configured to enable computing device 8000, in response to execution by one or more processor(s) 8004, to practice all or selected communications shown in FIGS. 2 and 4-7, depending on whether computing device 8000 is used to implement UE 102, eNB 106, first processing entity 130, second processing entity 132, client application 134 or AF 110. More specifically, one or more of the memory components such as volatile memory (e.g., DRAM 8008), non-volatile memory (e.g., ROM 8010), flash memory 8012, and the mass storage device may include temporal and/or persistent copies of instructions that, when executed, by one or more processor(s) 8004, enable computing device 8000 to operate one or more logics 8036 configured to practice all or selected aspects of FIGS. 2 and 4-7, depending on whether computing device 8000 is used to implement UE 102, eNB 106, first processing entity 130, second processing entity 132, client application 134 or AF 110.

The communication chips 8006 may enable wired and/or wireless communications for the transfer of data to and from the computing device 8000. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 8006 may implement any of a number of wireless standards or protocols, including but not limited to IEEE 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as any other wireless protocols that are designated as 3G, 4G, 5G, and beyond. The computing device 8000 may include a plurality of communication chips 8006. For instance, a first communication chip 8006 may be dedicated to shorter range wireless communications such as Wi-Fi and Bluetooth and a second communication chip 8006 may be dedicated to longer range wireless communications such as GPS, EDGE, GPRS, CDMA, WiMAX, LTE, Ev-DO, and others.

In various implementations, the computing device 8000 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 8000 may be any other electronic device that processes data.

Embodiments of apparatus, packages, computer-implemented methods, systems, devices, and computer-readable media (transitory and non-transitory) are described herein for a UE to generate, for transmission to a remote entity executing on a remote computing device in communication with the UE over an air interface of an EUTRAN, a container that includes UE or base station configuration data, or OTT application configuration data. In various embodiments, the UE may transmit the container through a logical tunnel between a local processing entity executing on the computing device and the remote entity. In various embodiments, the logical tunnel may pass through the air interface.

In various embodiments, the logical tunnel may reside on a control plane of the air interface and the container is transmitted using at least one of radio resource signaling or NAS signaling. In various embodiments, the logical tunnel may reside on a data plane of the air interface. In various embodiments, a PDN connection separate from other PDN connections associated with the UE may be established for the logical tunnel.

In various embodiments, the container may include a QoS template for deep packet inspection. In various embodiments, the container may include an indication of a platform of the UE, a hardware capability of the UE, or an application executed by the UE. In various embodiments, the container may include an inactivity time interval associated with the UE and is addressed to an application function executing on a remote computing device. In various embodiments, the container may include cross-layer adaptation configuration data. In various embodiments, the container may include QoE feedback for delivery to an application function.

Similarly, in various embodiments, an eNB may be configured to generate, for transmission to a remote entity executing on a UE in communication with the eNB over an air interface of an EUTRAN, a container that includes UE or base station configuration data, or OTT application configuration data. In various embodiments, the eNB may be configured to transmit, through a logical tunnel between a local processing entity executing on the eNB and the UE, the container. In various embodiments, the logical tunnel may pass through the air interface.

In various embodiments, the container may include a request for an inactivity time interval associated with the UE. In various embodiments, the container may include an indication of one or more services offered by the eNB. In various embodiments, the one or more services may include UE proximity connectivity support. In various embodiments, the container may include configuration data for heterogeneous network management or multiple RAT resource management. In various embodiments, the container may include an indication of a platform or hardware capability of the eNB.

In various embodiments, a computing device operating an application function may be configured to obtain, from another computing device over a computer network, an inactivity time interval associated with a UE and operating a UE application configured to interact with the application function. In various embodiments, the computing device may schedule transmission of one or more keep-alive notifications from the application function to the UE application to reduce a frequency of state transitions by the UE based on the inactivity time interval associated with the UE.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus comprising;
   memory having instructions; and
   processing circuitry coupled with the memory to execute the instructions to:
   generate, for transmission to a remote entity executing on a remote computing device in communication with the apparatus over an air interface of an evolved universal terrestrial access network ("EUTRAN"), a container that includes user equipment ("UE") or evolved Node B ("eNB") configuration data, or over-the-top ("OTT") application configuration data; and
   cause transmission of the container through a logical tunnel between a local processing entity executing on the apparatus and the remote entity;
   wherein:
   the logical tunnel passes through, and resides on a data plane of, the air interface, and a public data network ("PDN") connection separate from other PDN connections associated with a UE is established for the logical tunnel; and the container includes: type indication to indicate a type of information encapsulated in the container and further includes an indication of a platform of the UE, a hardware capability of the UE, or an application executed by the UE; an inactivity time interval associated with the UE and is addressed to an application function executing on another remote computing device; or Quality of Experience ("QoE") feedback for delivery to an application function.

2. The apparatus of claim 1, wherein the apparatus is the UE.

3. The apparatus of claim 2, wherein the container includes a Quality of Service ("QoS") template for deep packet inspection.

4. The apparatus of claim 2, wherein the container includes cross-layer adaptation configuration data.

5. A system comprising the apparatus of claim 2 and a touch screen display.

6. The apparatus of claim 1, wherein the apparatus is an eNB.

7. The apparatus of claim 6, wherein the container includes a request for an inactivity time interval associated with a UE served by the eNB.

8. The apparatus of claim 6, wherein the container includes an indication of one or more services offered by the eNB.

9. The apparatus of claim 8, wherein the one or more services includes UE proximity connectivity support.

10. The apparatus of claim 6, wherein the container includes configuration data for heterogeneous network management or multiple radio access technology ("RAT") resource management.

11. The apparatus of claim 6, wherein the container includes an indication of a platform or hardware capability of the eNB.

12. One or more non-transitory, computer-readable media having instructions that, when executed, cause an apparatus to:

generate, for transmission to a remote entity executing on a remote computing device in communication with the apparatus over an air interface of an evolved universal terrestrial access network ("EUTRAN"), a container that includes user equipment ("UE") or evolved Node B ("eNB") configuration data, or over-the-top ("OTT") application configuration data; and transmit the container through a logical tunnel between a local processing entity executing on the apparatus and the remote entity;

wherein:

the logical tunnel passes through, and resides on a data plane of, the air interface, and a public data network ("PDN") connection separate from other PDN connections associated with a UE is established for the logical tunnel; and the container includes: type indication to indicate a type of information encapsulated in the container and further includes an indication of a platform of the UE, a hardware capability of the UE, or an application executed by the UE; an inactivity time interval associated with the UE and is addressed to an application function executing on another remote computing device; or Quality of Experience ("QoE") feedback for delivery to an application function.

13. The one or more non-transitory, computer-readable media of claim 12, wherein the apparatus is the UE.

14. The one or more non-transitory, computer-readable media of claim 12, wherein the apparatus is an eNB.

15. The one or more non-transitory, computer-readable media of claim 14, wherein the container includes a request for an inactivity time interval associated with a UE served by the eNB; an indication of a UE proximity connectivity support service offered by the eNB; configuration data for heterogeneous network management or multiple radio access technology ("RAT") resource management; or an indication of a platform or hardware capability of the eNB.

* * * * *